United States Patent [19]

Hopkins

[11] Patent Number: 4,842,804
[45] Date of Patent: Jun. 27, 1989

[54] INTEGRAL REACTOR CAVITY SEAL/SHIELD

[75] Inventor: William C. Hopkins, Germantown, Md.

[73] Assignee: Bechtel Eastern Power Corporation, Gaithersburg, Md.

[21] Appl. No.: 135,570

[22] Filed: Dec. 21, 1987

Related U.S. Application Data

[63] Continuation of Ser. No. 869,149, May 30, 1986, abandoned.

[51] Int. Cl.⁴ ............................................. O21C 11/00
[52] U.S. Cl. .................. 376/203; 250/518.1; 376/287
[58] Field of Search ............... 250/518.1; 376/203, 376/205, 287

[56] References Cited

U.S. PATENT DOCUMENTS

| | | | |
|---|---|---|---|
| 3,633,784 | 1/1972 | Taft | 376/205 |
| 4,070,221 | 1/1978 | Anthony | 376/205 |
| 4,123,662 | 10/1978 | Fisher | 376/287 |
| 4,126,515 | 11/1978 | Klotz et al. | 376/287 |
| 4,170,517 | 10/1979 | Meuschke et al. | 376/205 |
| 4,214,760 | 7/1980 | Godfrey | 376/205 |
| 4,508,678 | 4/1985 | Costes | 376/205 |
| 4,584,163 | 4/1986 | Hankinson | 376/205 |
| 4,600,553 | 7/1986 | Katz et al. | 376/287 |
| 4,747,993 | 5/1988 | Hankinson et al. | 376/205 |

Primary Examiner—Deborah L. Kyle
Assistant Examiner—Richard W. Wendtland
Attorney, Agent, or Firm—Townsend and Townsend

[57] ABSTRACT

A reactor cavity seal and shielding system for a PWR that protects personnel from radiation during full power operation and shutdown conditions, and allows the refueling canal to be flooded while allowing access to the lower portions of the reactor well. An integral annular seal and shield is sealed to the pressure vessel and to the primary shield. The seal preferably extends horizontally from a flange on the reactor pressure vessel to an inwardly extending ledge on the primary shield, and carries a generally coextensive body of solid neutron-absorbing material. The seal may be fabricated from stainless steel, and preferably incorporates a bellows seal to accommodate thermal expansion. The shield may be silicone rubber, refractory concrete, or any solid neutron absorber.

5 Claims, 4 Drawing Sheets

INTEGRAL REACTOR CAVITY SEAL/SHIELD

This is a continuation of Ser. No. 869,149 filed May 30, 1986, now abandoned.

FIELD OF THE INVENTION

The present invention relates generally to nuclear reactors, and more particularly to a structure for shielding and sealing the gap between a pressurized water reactor pressure vessel and the surrounding primary shield wall.

BACKGROUND OF THE INVENTION

In a pressurized water reactor ("PWR") a pressure vessel within which the reactor core is located sits in a reactor cavity surrounded by a structural wall (typically concrete) known as the primary shield. The pressure vessel has a number of radially extending nozzles through which coolant enters and leaves the vessel, and is configured with a removable head to allow access to the core. The upward extensions of the primary shield above the head define a refueling canal which is flooded so that refueling operations may be carried out under water. The refueling canal walls extend upwardly to an operating deck which provides access to other components of the reactor complex. A typical height of the operating deck is about 20 feet above the level of the joint between the pressure vessel and the head.

For safety reasons, it is typically a requirement that the pressure vessel and nozzles be visually inspected during shutdown. To allow such inspection, the primary shield is spaced radially outwardly from the pressure vessel to define an annular gap, which may be on the order of 2-3 feet in radial extent. During refueling, the pressure vessel is sealed to the primary shield at the level of the pressure vessel joint so that the water in the refueling canal is prevented from entering the annular gap. The prior art shows two main approaches. In one approach, seal rings are bolted into place prior to flooding the canal. In the other approach, a seal ring remains in place at all times. U.S. Pat. No. 4,170,517 to Meuschke et al. shows a permanently installed seal ring extending from a flange on the pressure vessel to a ledge on the primary shield. The seal ring is welded at both ends and curves downwardly from the pressure vessel to the shield to accommodate thermal expansion and contraction of the vessel.

During full power operation, neutrons and gamma rays that penetrate the pressure vessel and are scattered upwardly from the pressure vessel and primary shield wall may make it unsafe for personnel on the operating deck. Thus, when access to the operating deck is required, it may be necessary to bring the reactor down to a 10% operating level.

Even during shutdown, radiation from the decaying fission products and the radio activated shield and piping often necessitates the provision of additional shielding. U.S. Pat. No. 4,090,087 to Weissenfluh discloses the use of removable water bags to provide an annular shield at the level of the pressure vessel joint. While the water bags are presumably effective for their stated purpose, their installation and removal are time consuming and subject personnel to additional exposure.

SUMMARY OF THE INVENTION

The present invention provides a reactor cavity seal and shielding system that protect personnel from radiation during full power operation and shutdown conditions, and allows the refueling canal to be flooded while allowing access to the lower portions of the reactor well.

In brief, these benefits are achieved by the provision of an integral annular seal and shield, sealed to the pressure vessel and to the primary shield. The seal preferably extends horizontally from a flange on the reactor pressure vessel to an inwardly extending ledge on the primary shield, and carries a generally coextensive body of solid neutron-absorbing material. The seal may be fabricated from stainless steel, and preferably incorporates a bellows seal to accommodate thermal expansion. The shield may be silicone rubber, refractory concrete, or any solid neutron absorber.

During full power operation of the reactor, the present invention protects personnel on the operating deck from neutron and the gamma rays streaming from the reactor cavity, and thus avoids the requirement that the reactor be brought down to a fraction of full power. Being in place at all times, the invention also prevents radioactivation of the stainless steel components above the level of the shield.

During refueling operations, prior to flooding the refueling canal, the shield allows personnel to work safely in the vicinity of the pressure vessel head without danger from exposure to the fission product gamma ray and the like. When the refueling canal is flooded, the seal isolates the annular gap from the water above.

A further understanding of the nature and advantages of the present extension may be realized by reference to the remaining portions of the specification and the attached drawings.

DESCRIPTION OF THE PREFERRED EMBODIMENTS

Figure 1:
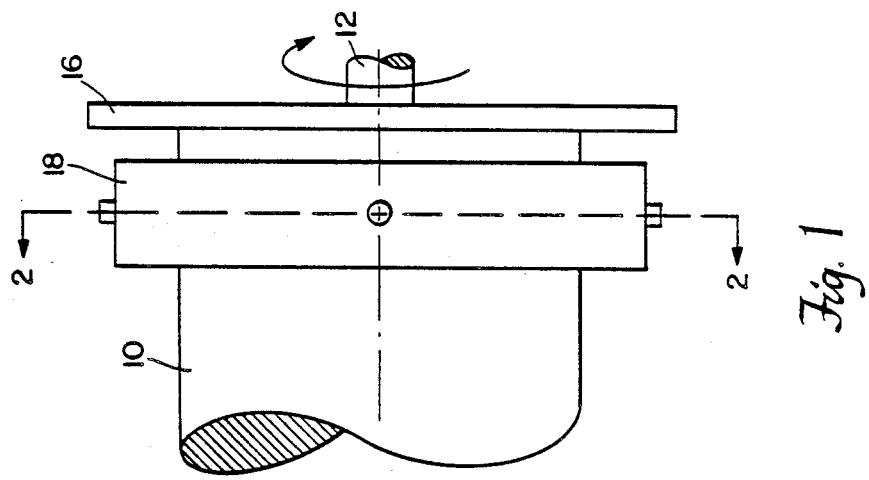
FIG. 1 is a simplified partly sectioned side elevation of a nuclear reactor embodying the present invention.

FIG. 1 is a simplified partly sectioned side elevation of a nuclear reactor 10 in which the present invention is installed. Reactor 10 is a pressurized water reactor ("PWR"), and will only be described to the extent necessary to illustrate the present invention. As is well known, the reactor comprises a pressure vessel 12 surrounded by a primary shield 15 spaced radially outwardly to define an annular gap 17. Pressure vessel 12 comprises a fixed lower portion 20 within which the core (not shown) is located, and a head 22 which is removable from the lower portion during refueling and other maintenance operations. The joint, designated 23, between the head and the lower portion defines the level of the open top of the vessel when the head is removed. Pressure Vessel 12 is formed with a peripheral annular flange 25 having an upper surface at or slightly below the level of joint 23. As is well known, pressure vessel 12 carries a number of radially extending nozzles 27 communicating to coolant pipes 28. Although the dimensions of the reactor are not part of the invention, they do define the environment, and representative dimensions will be given as an aid to visualizing the invention. In this context, it is noted that pressure vessel 12 is about 15–20 feet in diameter, and annular gap 17 is about 6 inches to 4 feet in radial extent. Flange 25 extends about 3–4 iinches radially.

Primary shield 15 is in the form of a cylindrical wall surrounding a pressure vessel 12 and formed with an annular ledge 30 at the level of flange 25. Ledge 30 is typically on the order of 18 inches wide. Shield 15 is formed with suitable apertures 32 through which coolant pipes 28 may pass, and extends upwardly beyond ledge 30 to define a refueling canal wall 33. Canal wall 33 extends upwardly to an operating deck 35. Periodic access to the operating deck is needed for visual observation of control rod drive mechanisms, sampling boric acid in the accumulators, and other inspection procedures. A typical distance between ledge 30 and operating deck 35 is about 20 feet. Primary shield 15 is typically very heavily reinforced concrete, about 7 feet thick, with a ⅛-inch stainless steel liner 37.

Figure 2:
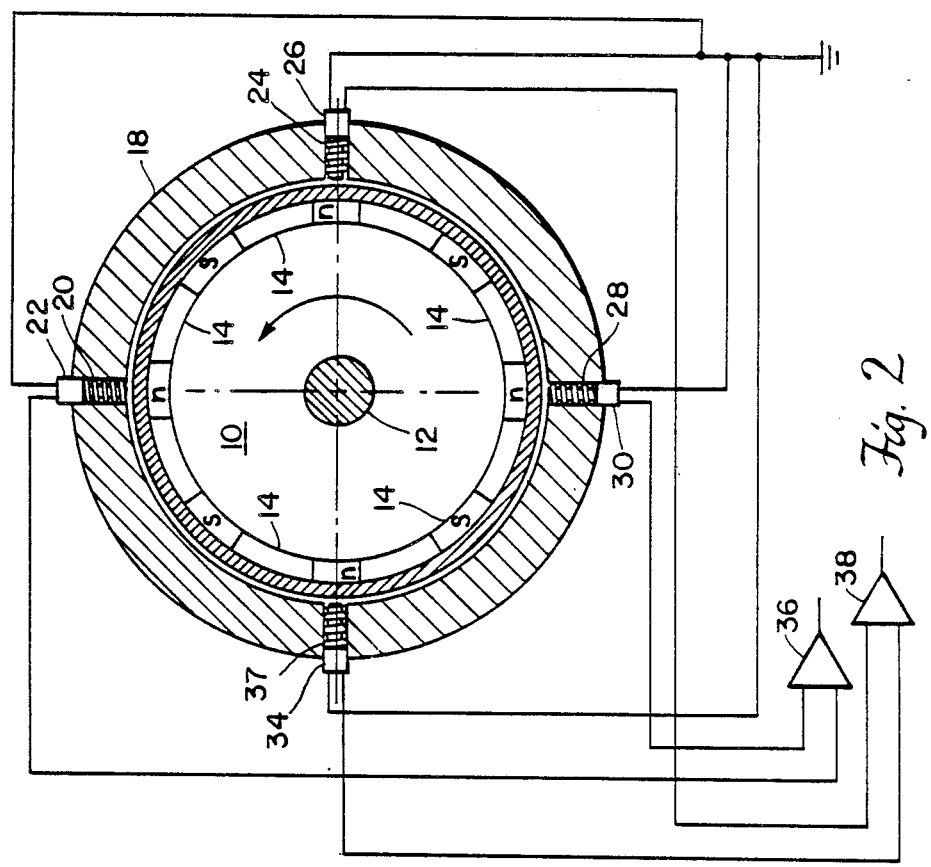
FIG. 2 is an enlarged cross-sectional view showing the detailed construction of the invention.

The present invention is an integral seal/shield 40 spanning annular gap 17 from flange 25 to ledge 30. FIG. 2 is an enlarged cross-sectional view of seal/shield 40. In broad terms, seal/shield 40 comprises a seal plate 42 and a shield 45 defined by a substantially consolidated body of solid neutron-absorbing material bonded to seal plate 42.

Seal plate 42 is sealed, preferably by circumferentially extending inner and outer welds 47 and 48 to flange 25 and ledge 30. Seal plate 42 is preferably stainless steel, on the order of ⅛-174 inch thick, and is provided with an expansion bellows 50 to accommodate relative movement between the vessel and the primary shield, as for example resulting from differential thermal expansion.

Shield 45 may be formed from any solid neutron-absorbing material. Silicone rubber (possibly with boron carbide added), serpentine concrete, and other refractory concrete-like materials would be suitable. A suitable high temperature, low density concrete material is marketed under the designation RX-277 by Reactor Experiments Company, San Diego, California. Although the particular thickness will depend on the installation, 12" is typical. Depending on the material, shield 45 may be provided with a protective cover, such as a thin coating or layer 52 of stainless steel.

Shield 45 is integrally bonded to seal plate 42 in any manner appropriate to the particular materials used. Where concrete is used, the undersurface of the seal plate preferably carries tie rods welded thereto to provide internal reinforcement of the concrete slab as well as an interlocking mechanical joint. In the event that silicone rubber is used, the materials will naturally bond to each other and mechanical aids to bonding are normally not needed. Nevertheless, tie rods may be appropriate for some installations.

Figure 3:
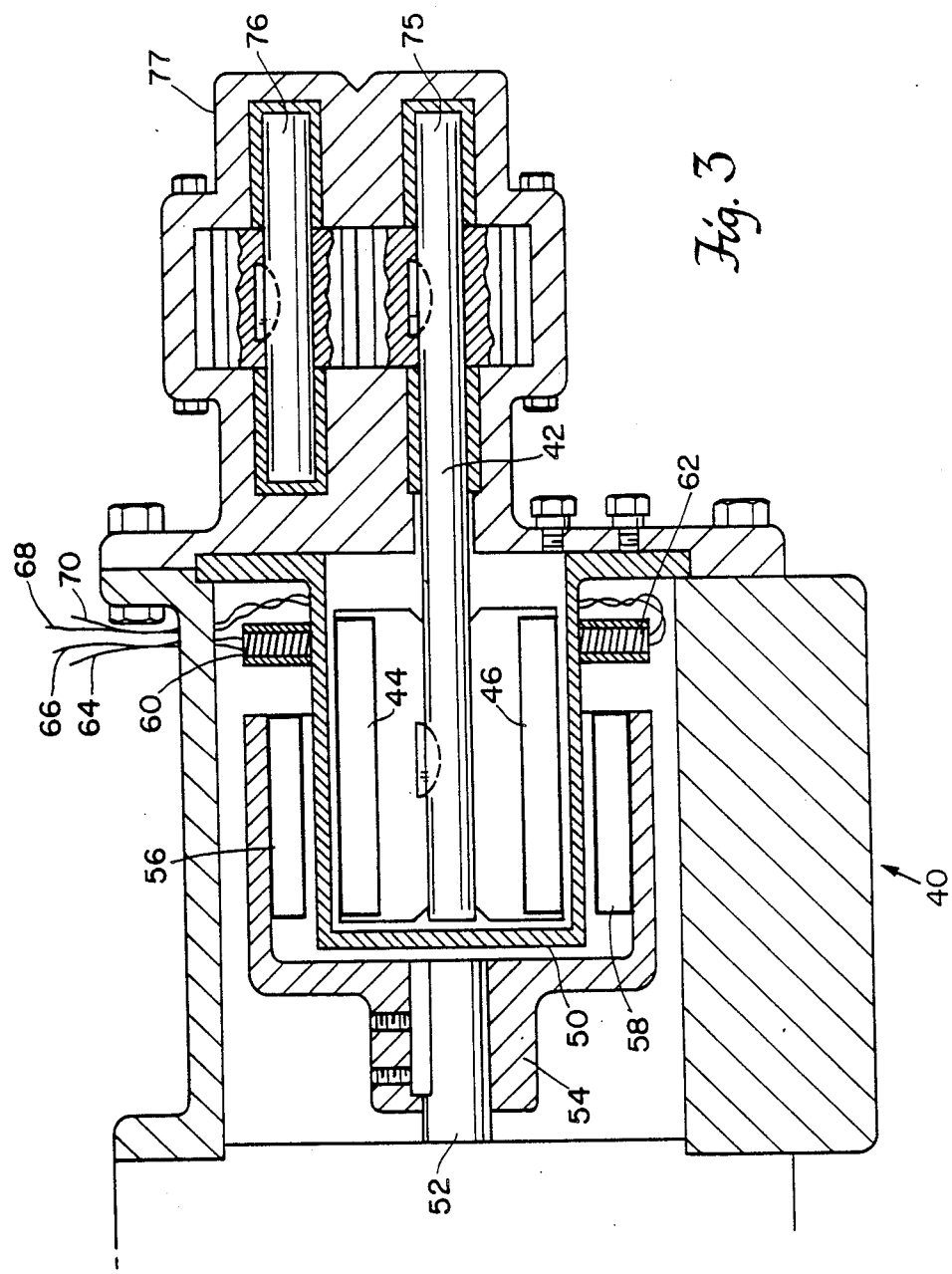
FIG. 3 is a top plan view of the invention.
Figure 4:
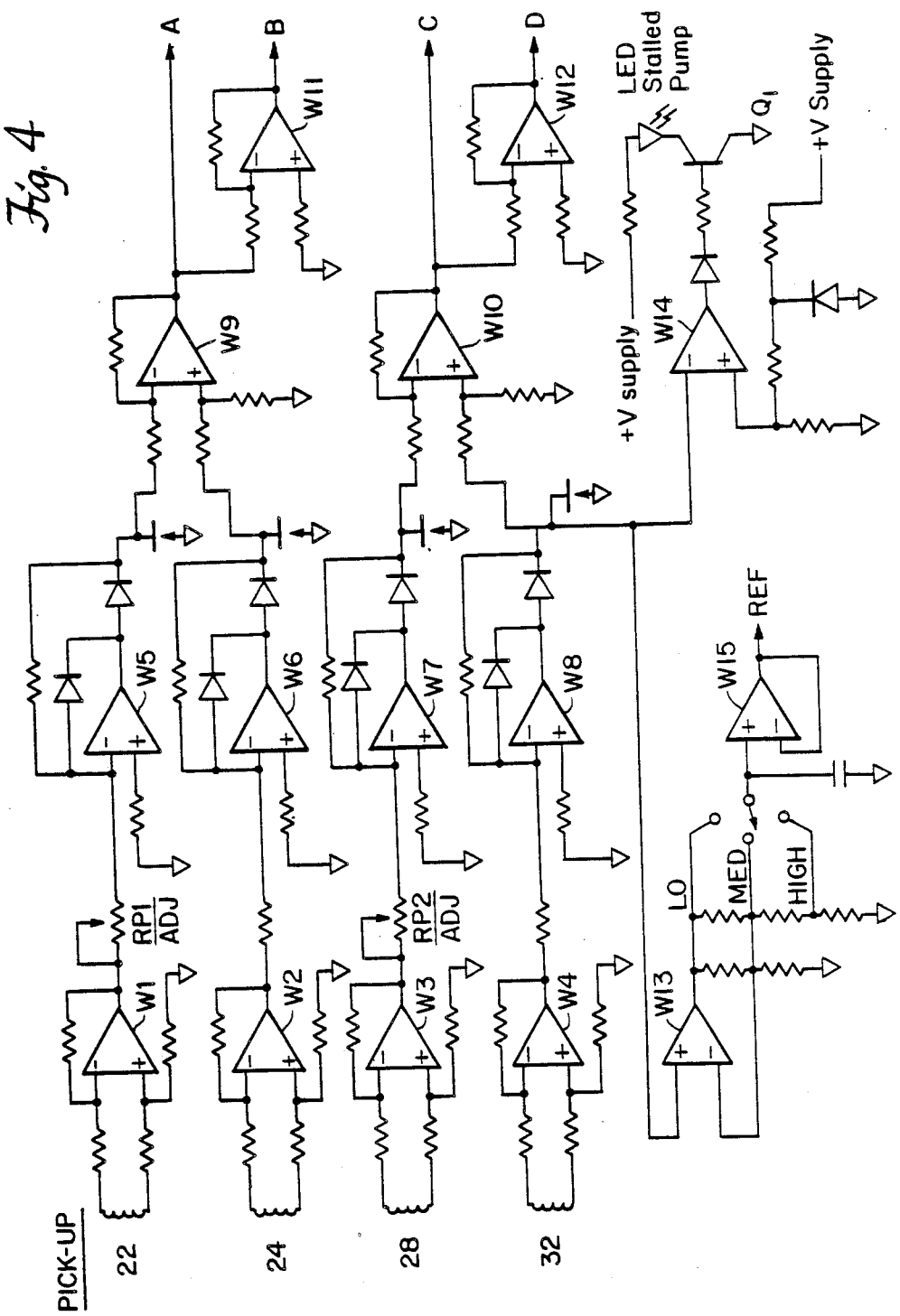
FIG. 4 is a cross-sectional view taken at line 4—4 of FIG. 3.

FIG. 3 is a top plan view of seal/shield 40; FIG. 4 is a cross-sectional view taken at line 4—4 of FIG. 3. Seal plate 42 is preferably formed with a number of manholes 55 at regular azimuthal intervals. While four manholes are shown, some installations may require eight or more. Manholes 55 penetrate seal plate 42 and shield 45, and are sized to permit passage of workers. While a circular configuration is preferred, an oval configuration is also appropriate, especially where the radial dimension of the gap does not permit a large enough circular manhole opening. Manholes 55 are covered with manhole covers 57 which when bolted to the top of seal plate 42 provide a water-tight seal around the periphery of the cover. Depending on the installation, some or all of manhole covers 57 may be provided with neutron-absorbing plugs 60.

Figure 5:
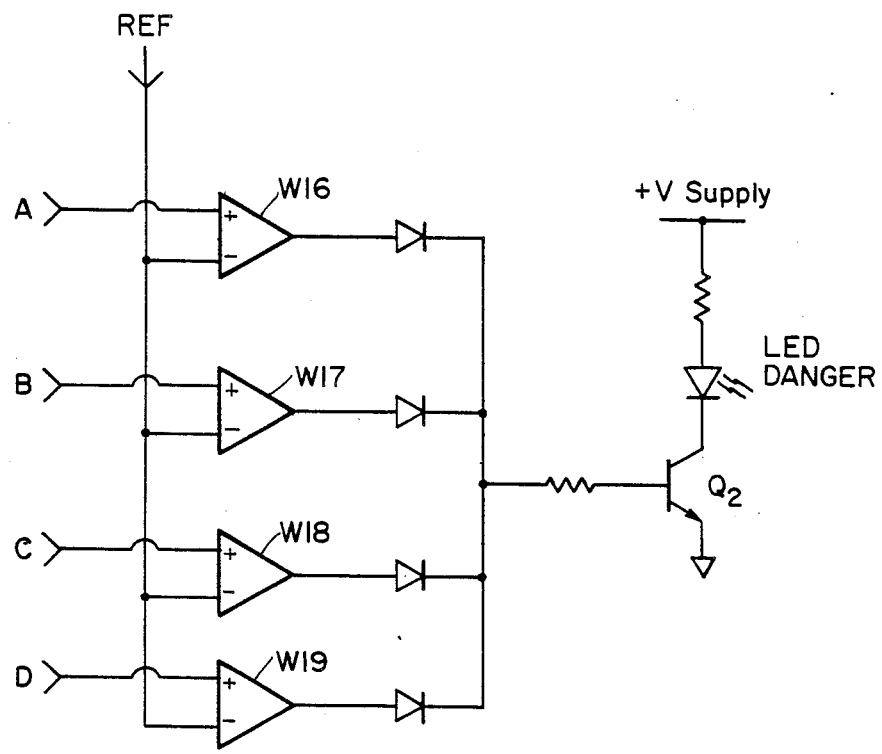
FIG. 5 is an enlarged cross-sectional view illustrating an alternative embodiment of the invention.

FIG. 5 is a cross sectional view illustrating an alternative embodiment in which a different arrangement is used to define the seal at flange 25 and accommodate expansion. In this embodiment, a gasket 70 is interposed between seal plate 42 and flange 25. Gasket 70 may be a flat silicone rubber gasket on the order of ⅛ inch thick. Seal plate 42 is not welded to the flange, but rather rests on gasket 70. The weight of the seal/shield assembly compresses the gasket to provide the seal. A radial gap between seal plate 42 and head 22, with a corresponding gap between the end of flange 25 and shield 45 allows differential movement to occur.

In conclusion, it can be seen that the present invention provides numerous benefits in the safety and economy of nuclear reactor operation. Shield 45 provides enough neutron and gamma absorption that personnel may safely go onto operating deck 35 during full power operation. At shutdown, personnel may safely work in the vicinity of pressure vessel head 22 without having to install water bags or other shielding. This avoids personnel exposure and saves time, thereby shortening the refueling cycle and enhancing operating efficiency. Once manhole covers 57 are in place, the refueling canal may be flooded. The manhole covers, having perimeters of limited extent, are relatively easy to seal. Since the seal remains in place at all times, the possibility of faulty seal installation, followed by unintended draining of the refueling canal, is avoided.

While the above is a full description of the preferred embodiments of the invention, alternate constructions, modifications, and equivalents may be used. For example, while the description above showed the solid shield beneath the seal plate, the shield could be located above the seal plate if clearance considerations so dictated. Therefore, the above-description and illustration should not be taken as limiting the scope of the invention which is defined by the appended claims.

I claim:

1. In a nuclear reactor wherein a reactor pressure vessel having a lower portion and a removable head is surrounded by a structural wall to define a gap between the pressure vessel and the structural wall, a seal/shield assembly normally in place during operation and refueling of the reactor, comprising:

a water-tight seal welded to the lower portion of the pressure vessel and the structural wall, said seal having an associated bellows for accommodating relative movement between the pressure vessel and the structural wall; and a shield defined by a substantially consolidated body of solid neutron-absorbing material fixed to and supported by said seal and generally coextensive therewith.

2. The seal/shield of claim 1 wherein said body is disposed beneath said seal.

3. The seal-shield of claim 1 wherein said body comprises silicon rubber.

4. The seal/shield of claim 1 wherein said body comprises refractory concrete.

5. In a nuclear reactor wherein a reactor pressure vessel having a lower portion and a removable head is surrounded by a structural wall to define a gap between the pressure vessel and the structural wall, wherein the lower portion of the pressure vessel is formed with a peripheral flange having a top surface at an elevation below the head, and wherein the structural wall is formed with a ledge having a top surface at substantially the same elevation as the top surface of the flange, a seal/shield assembly normally in place during operation and refueling of the reactor comprising:

an annular seal plate having radially inner and outer edges, being welded to and providing a liquid-tight fit with the top surface of the flange and the top surface of the ledge, said seal plate having an associated bellows for accommodating relative movement between the pressure vessel and the structural wall; and a substantially consolidated body of solid neutron-absorbing material bonded to and supported by the undersurface of said seal plate and generally coextensive therewith.

* * * * *

UNITED STATES PATENT AND TRADEMARK OFFICE
CERTIFICATE OF CORRECTION

PATENT NO. : 4,842,804

DATED : June 27, 1989

INVENTOR(S) : William C. Hopkins

It is certified that error appears in the above-identified patent and that said Letters Patent is hereby corrected as shown below:

The title page showing the illustrative figure should be deleted to appear as per attached title page.

Replace Sheets 1 through 4 with Sheets 1 and 2 as shown on the attached pages.

Signed and Sealed this

Fifth Day of December, 1989

Attest:

JEFFREY M. SAMUELS

*Attesting Officer*     *Acting Commissioner of Patents and Trademarks*

United States Patent [19]

Hopkins

[11] Patent Number: 4,842,804
[45] Date of Patent: Jun. 27, 1989

[54] INTEGRAL REACTOR CAVITY SEAL/SHIELD

[75] Inventor: William C. Hopkins, Germantown, Md.

[73] Assignee: Bechtel Eastern Power Corporation, Gaithersburg, Md.

[21] Appl. No.: 135,570

[22] Filed: Dec. 21, 1987

Related U.S. Application Data

[63] Continuation of Ser. No. 869,149, May 30, 1986, abandoned.

[51] Int. Cl.⁴ .............................. O21C 11/00
[52] U.S. Cl. ..................... 376/203; 250/518.1; 376/287
[58] Field of Search ............... 250/518.1; 376/203, 376/205, 287

[56] References Cited

U.S. PATENT DOCUMENTS

| | | | |
|---|---|---|---|
| 3,633,784 | 1/1972 | Taft | 376/205 |
| 4,070,221 | 1/1978 | Anthony | 376/205 |
| 4,123,662 | 10/1978 | Fisher | 376/287 |
| 4,126,515 | 11/1978 | Klotz et al. | 376/287 |
| 4,170,517 | 10/1979 | Meuschke et al. | 376/205 |
| 4,214,760 | 7/1980 | Godfrey | 376/205 |
| 4,508,678 | 4/1985 | Costes | 376/205 |
| 4,584,163 | 4/1986 | Hankinson | 376/205 |
| 4,600,553 | 7/1986 | Katz et al. | 376/287 |
| 4,747,993 | 5/1988 | Hankinson et al. | 376/205 |

Primary Examiner—Deborah L. Kyle
Assistant Examiner—Richard W. Wendtland
Attorney, Agent, or Firm—Townsend and Townsend

[57] ABSTRACT

A reactor cavity seal and shielding system for a PWR that protects personnel from radiation during full power operation and shutdown conditions, and allows the refueling canal to be flooded while allowing access to the lower portions of the reactor well. An integral annular seal and shield is sealed to the pressure vessel and to the primary shield. The seal preferably extends horizontally from a flange on the reactor pressure vessel to an inwardly extending ledge on the primary shield, and carries a generally coextensive body of solid neutron-absorbing material. The seal may be fabricated from stainless steel, and preferably incorporates a bellows seal to accommodate thermal expansion. The shield may be silicone rubber, refractory concrete, or any solid neutron absorber.

5 Claims, 4 Drawing Sheets

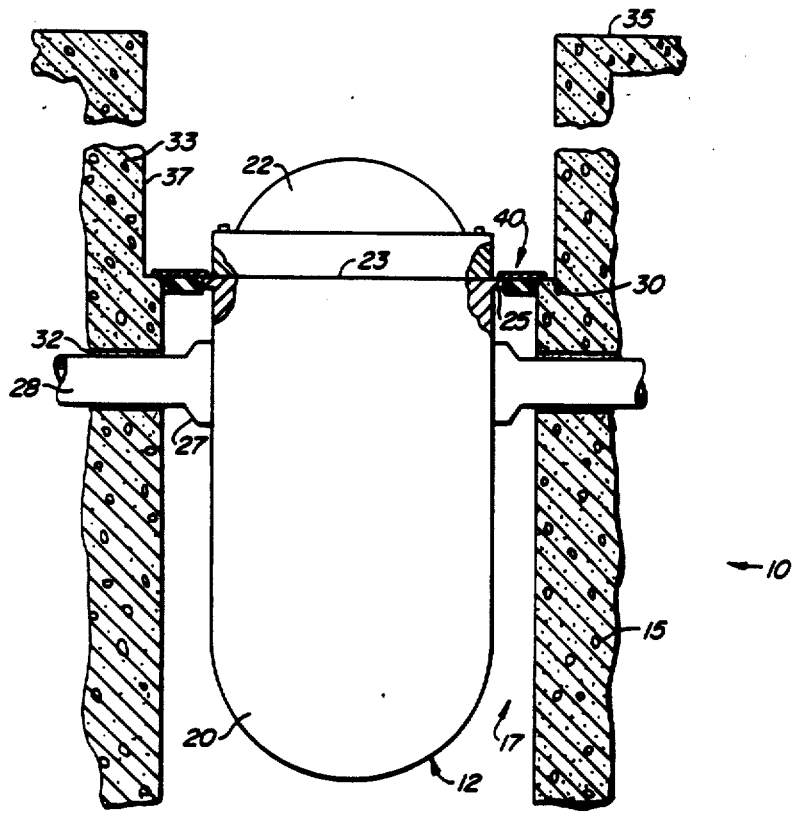

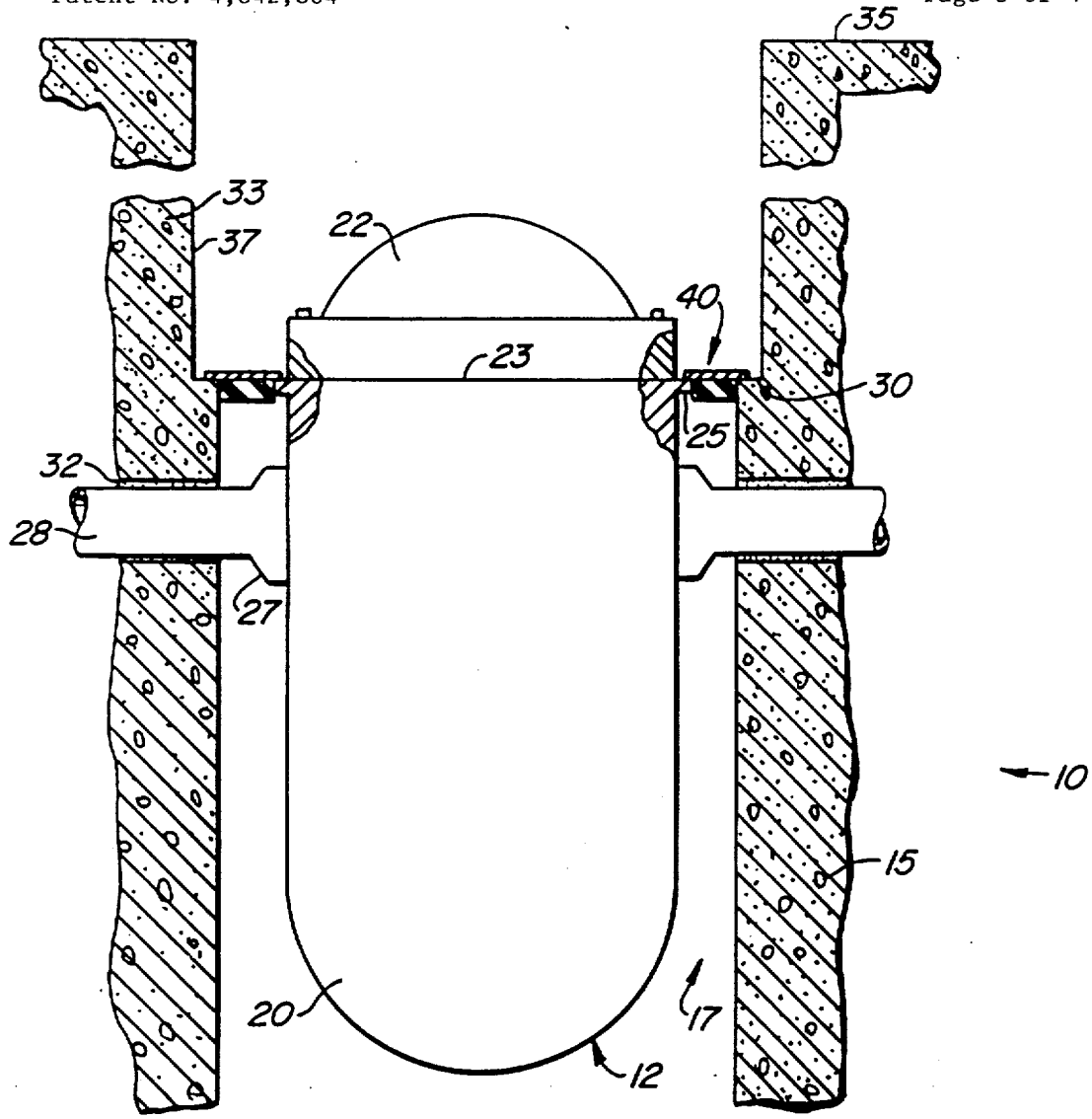
FIG._1.
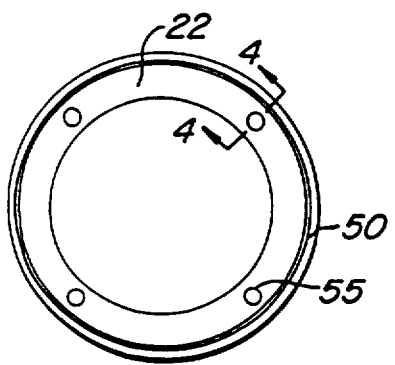
FIG._3.
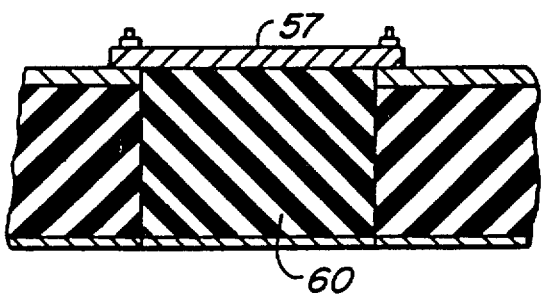
FIG._4.

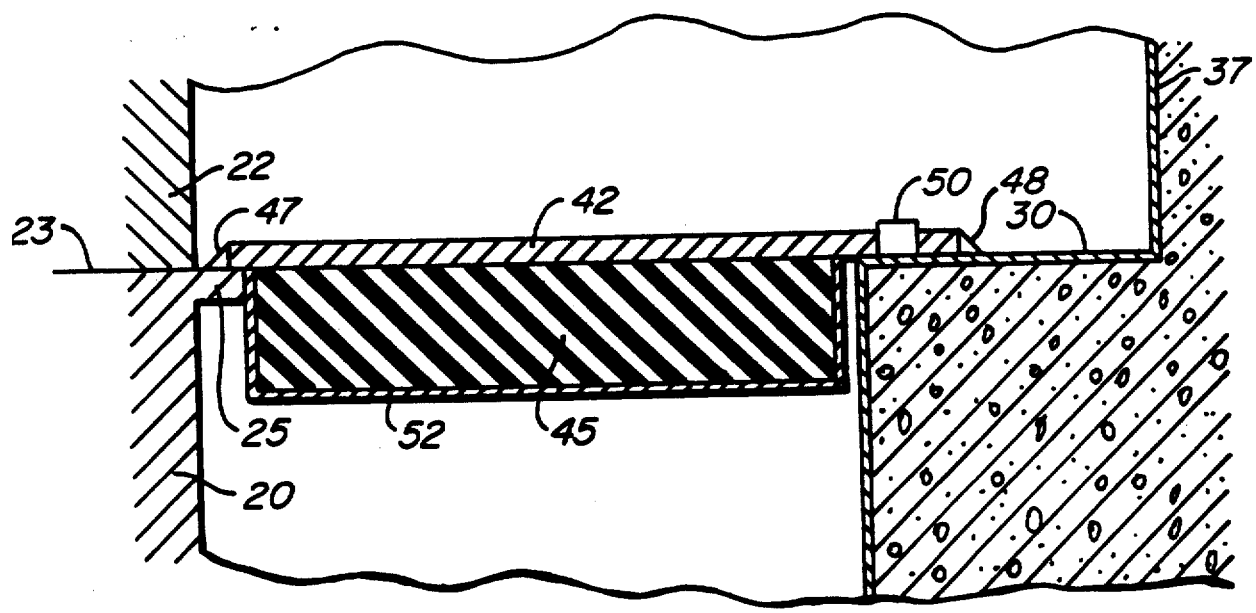
FIG._2.
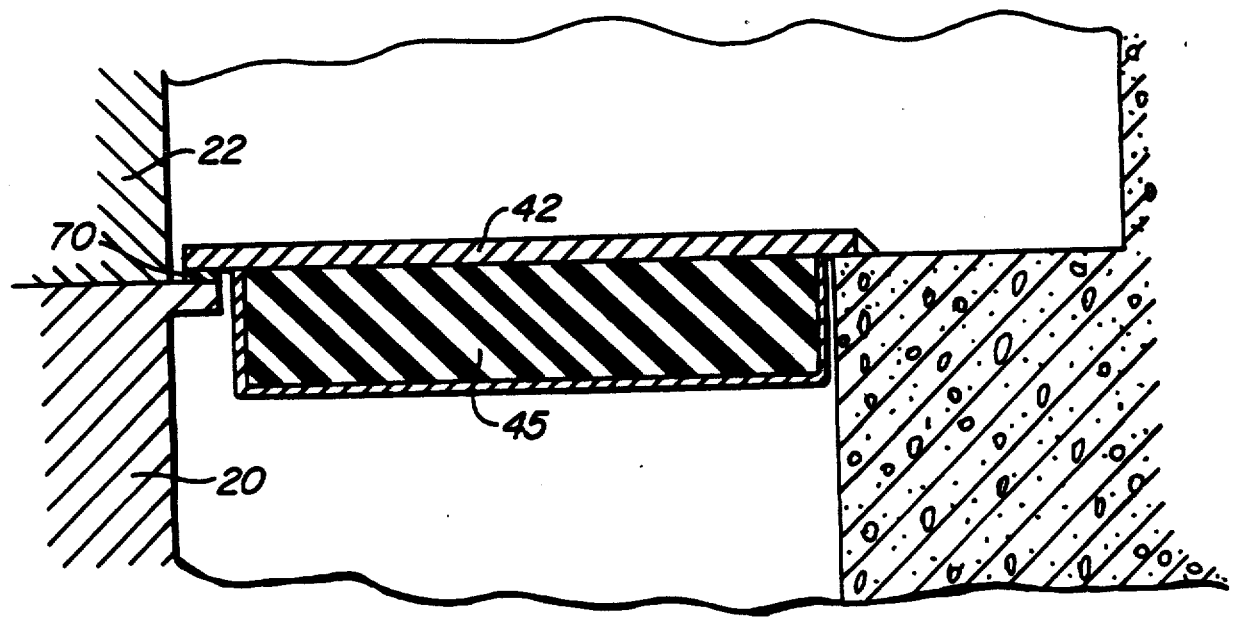
FIG._5.